H. MARAS.
COUPLING FOR PORTABLE ELECTRIC LAMPS.
APPLICATION FILED DEC. 9, 1920.
1,412,127.
Patented Apr. 11, 1922.
2 SHEETS—SHEET 2.
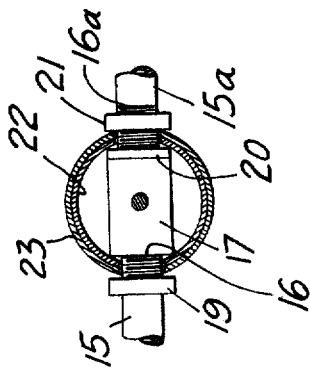
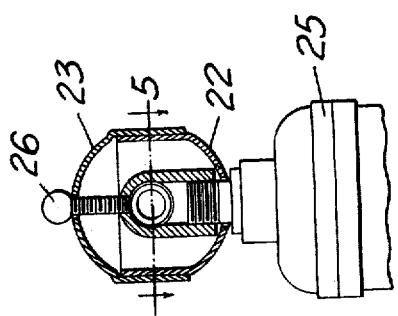
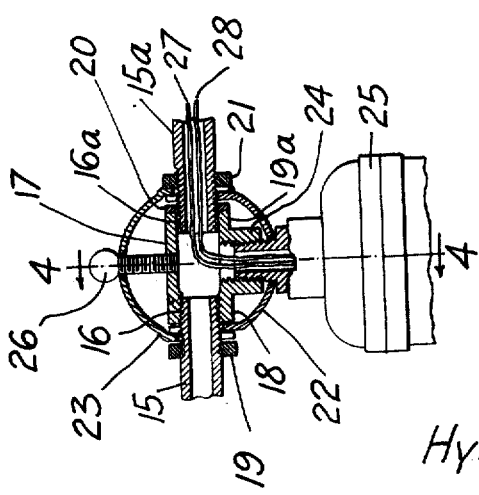
Hynek Maras
INVENTOR.
BY Walter E. Wollheim
ATTORNEY.

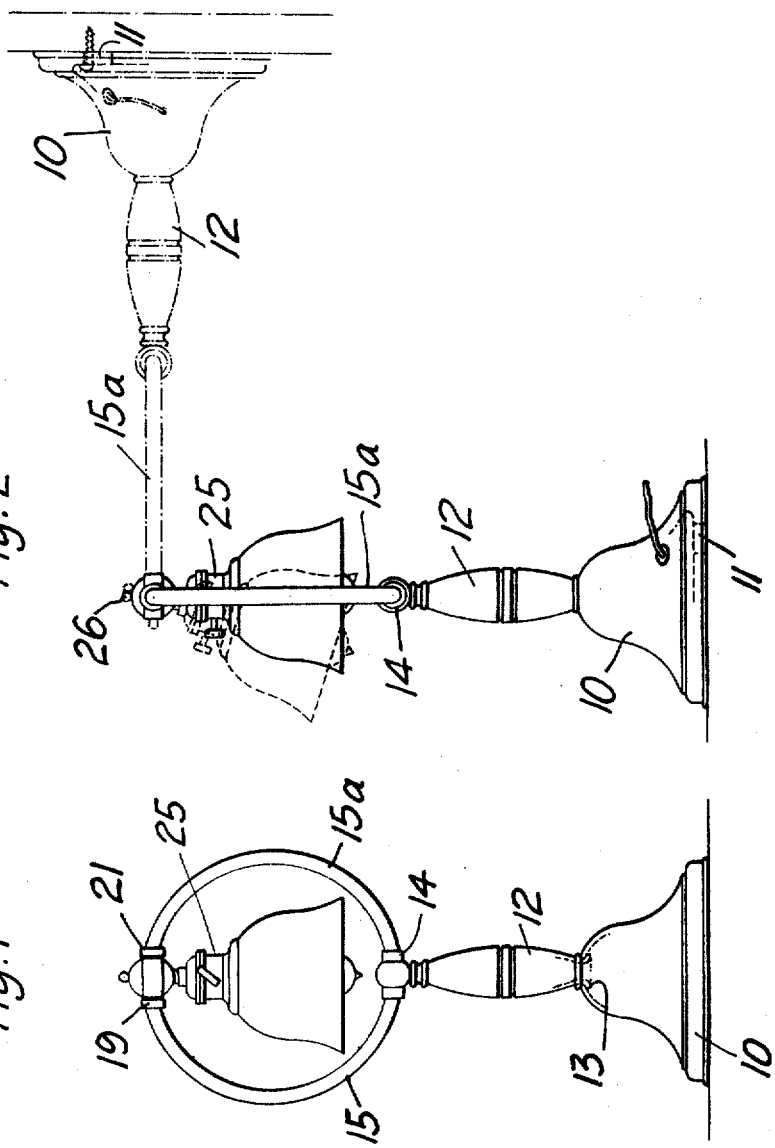

UNITED STATES PATENT OFFICE.

HYNEK MARAS, OF WOODSIDE, NEW YORK, ASSIGNOR TO RENNER & MARAS, OF LONG ISLAND CITY, NEW YORK, A FIRM.

COUPLING FOR PORTABLE ELECTRIC LAMPS.

1,412,127.  Specification of Letters Patent.  Patented Apr. 11, 1922.

Application filed December 9, 1920. Serial No. 429,535.

*To all whom it may concern:*

Be it known that I, HYNEK MARAS, a citizen of the Republic of Czecho-Slovakia, and a resident of Woodside, Long Island, in the county of Queens and State of New York, have invented certain new and useful Improvements in Couplings for Portable Electric Lamps, of which the following is a specification.

This invention relates to improvements in couplings for portable electric lamps and it is a particular object of the invention to provide such lamps with means to adjust the light or bulb of the same at any desired angle. Another object is to accomplish this with a coupling of simple and sturdy construction in which it is impossible for the electric wires to cross each other in such a manner as to eventually cause short circuits, making lamps equipped with these couplings much safer than others heretofore in use.

The invention is illustrated by the accompanying drawings, in which—

Fig. 1 is a front elevation of the lamp;

Fig. 2 is a side view of the lamp in which is indicated, in dotted lines, the position of the stand when applied horizontally; this drawing also shows the light or bulb tilted at a slight angle.

Fig. 3 is a longitudinal cross sectional view through the coupling of the lamp, drawn on a larger scale;

Fig. 4 is a vertical cross sectional view through the coupling along the plane of line 4—4 in Fig. 3;

Fig. 5 is a horizontal cross sectional view of the coupling along the plane of the line 5—5 in Fig. 4.

Like characters of reference denote similar parts throughout the several views and the following specification.

10 is a base, provided with an opening 11, for fastening to a wall, as shown in Fig. 2. Its upper part is shaped to receive a support arm 12. A lower end 13 of arm 12 is spun over and within the upper part of base 10, sufficiently free however to enable the support to swivel about its own axis, for purposes of adjustment as explained hereafter. The upper end of stand 12 is provided with a T coupling 14. Fastened to both ends of coupling 14 are two preferably semi-circularly extending tubes 15 and 15$^A$. The ends of tubes 15 and 15$^A$ are fastened to couplings 14 either by threading or sweating in, which is the customary manner of rigidly connecting tubes in lighting fixtures. The upper ends of tubes 15 and 15$^A$ are threaded at, respectively, 16 and 16$^A$. 17 is a T coupling into one end 18 of which is screwed the threaded end 16 of pipe 15. 19 is a bushing sweated onto the threaded end of pipe 15 and rigidly connected therewith. Bushing 19 is so positioned on pipe 15, as to leave a certain amount of clearance between itself and the end of coupling 17. An end 19$^A$ of T coupling 17 opposite 18 is bored out interiorly to allow threaded end 16$^A$ of pipe 15$^A$ to be inserted therein; there is however no threaded contact between pipe 15$^A$ and coupling 17. 20 is a small bushing screwed and sweated onto threaded end 16$^A$ of pipe 15$^A$ and butting up against the end 19$^A$ of T 17. 21 is another bushing or lock nut screwed onto pipe 15$^A$, not sweated on, but in movable relation therewith. 22 is an inner cup shaped ornament and 23 an outer cup shaped ornament, both so arranged as to enable the outer cup 23 to be forced over part of the inner cup 22, and cut out at both sides, so as to slide over the threaded pipe ends 16 and 16$^A$. Attention is called to the fact that end 19$^A$ of T 17 is somewhat shorter than end 18, and that end 19$^A$ plus the thickness of bushing 20 is approximately of the same length as end 18. 24 is a depending branch of T 17 substantially at right angles to ends 18 and 19$^A$, internally threaded to receive a socket member 25 of the light proper, to which is attached the bulb and shade in the usual manner. 26 is a screw passing through an opening of the outer hollow cup 23 and in threaded engagement with the body of the coupling 17 for the purpose of fastening the cup 23 to the fixture. Cup 22 is held in position by a shoulder on socket 25 as illustrated in Fig. 3. 27 and 28 are the customary positive and negative wires conveying electric current to the bulb of the lamp.

Inspection of Fig. 3 of the drawings discloses the obvious fact that coupling 17 and therefore cup shaped members 22 and 23 and the socket 25, may be tilted at various angles. Should it be desired to fix the light in any such selected position, it is only necessary to draw up lock nut 21 against the side of cup 23, whereby sufficient frictional contact is caused to hold the light in such fixed position.

With this construction it is also obvious that the wires 27 and 28 are revolved, when tilting the lamp, in the same fixed relation to each other, whereby the usual twisting of wires, customary in lighting fixtures of this character, is entirely avoided, eliminating short circuits and other serious failures.

What I claim as new, is:

1. In a lighting fixture, an adjustable coupling comprising in combination, two support tubes, a T connection, in threaded engagement with one of the support tubes and telescoping over the other, a socket fastened to the said T connection, outer and inner ornaments covering the said T connection, means fastening the said ornaments to the said T connection, and an adjustable lock nut on one of the support tubes and outside of the said ornaments, to hold the said coupling in any selected position.

2. In a lighting fixture, an adjustable coupling, comprising a T connection one end of which is in threaded engagement with a support tube, the opposite end of the T connection being telescoped over another support tube, bushings on said support tubes, a socket fastened to the other branch of the said T connection, an outer and inner ornament covering the said T connection, and an adjustable lock nut on one of the support tubes and outside of the said ornaments to hold the said coupling in any selected position.

In testimony whereof I have hereunto set my hand and seal in presence of two subscribing witnesses.

HYNEK MARAS. [L. S.]

Witnesses:
PAUL A. FIELRIGER,
MARGOT WOLLHEIM.